US011823355B2

(12) United States Patent
Gilcher

(10) Patent No.: US 11,823,355 B2
(45) Date of Patent: Nov. 21, 2023

(54) DEPTH BASED IMAGE SHARPENING

(71) Applicant: Nvidia Corporation, Santa Clara, CA (US)

(72) Inventor: Pascal Gilcher, Koerborn (DE)

(73) Assignee: Nvidia Corporation, Santa Clara, CA (US)

(*) Notice: Subject to any disclaimer, the term of this patent is extended or adjusted under 35 U.S.C. 154(b) by 149 days.

(21) Appl. No.: 17/165,085

(22) Filed: Feb. 2, 2021

(65) Prior Publication Data

US 2022/0245772 A1 Aug. 4, 2022

(51) Int. Cl.
| | | |
|---|---|---|
| G06T 5/00 | (2006.01) | |
| G06T 7/50 | (2017.01) | |
| G06T 5/20 | (2006.01) | |
| G06T 11/00 | (2006.01) | |

(52) U.S. Cl.
CPC .............. *G06T 5/003* (2013.01); *G06T 5/20* (2013.01); *G06T 7/50* (2017.01); *G06T 11/001* (2013.01); *G06T 2207/10016* (2013.01); *G06T 2207/10024* (2013.01)

(58) Field of Classification Search
CPC .. G06T 5/003; G06T 5/20; G06T 7/50; G06T 11/001; G06T 2207/10016; G06T 2207/10024; G06T 2207/10028
See application file for complete search history.

(56) References Cited

U.S. PATENT DOCUMENTS

| | | | | |
|---|---|---|---|---|
| 6,252,997 B1* | 6/2001 | Miura | ..................... | G06T 15/20 |
| | | | | 382/264 |
| 9,747,514 B2* | 8/2017 | Lim | ........................ | G06T 5/002 |
| 10,708,486 B2* | 7/2020 | Lee | .................. | H04N 5/232122 |
| 11,238,624 B2* | 2/2022 | Liao | ..................... | G06T 11/001 |
| 2009/0079862 A1* | 3/2009 | Subbotin | ............ | H04N 5/23212 |
| | | | | 348/E5.042 |
| 2010/0310165 A1* | 12/2010 | Chen | ....................... | G06T 5/003 |
| | | | | 382/167 |
| 2011/0085741 A1* | 4/2011 | Zhang | ..................... | G06T 5/003 |
| | | | | 382/255 |
| 2011/0122296 A1* | 5/2011 | Liu | ......................... | G06T 5/003 |
| | | | | 348/241 |
| 2011/0285813 A1 | 11/2011 | Girdzijauskas et al. | | |
| 2012/0162395 A1* | 6/2012 | Ho | ....................... | H04N 13/128 |
| | | | | 348/E13.001 |
| 2012/0301044 A1* | 11/2012 | Nakada | ................ | H04N 5/2258 |
| | | | | 382/255 |
| 2014/0294299 A1* | 10/2014 | Kim | ........................ | G06T 5/002 |
| | | | | 382/167 |

(Continued)

OTHER PUBLICATIONS

Liu et al. (NPL titled: Guided inpainting and filtering for Kinect depth maps) 21st International Conference on Pattern Recognition (ICPR 2012) Nov. 11-15, 2012. Tsukuba, Japan (Year: 2012).*

(Continued)

*Primary Examiner* — Andrae S Allison
(74) *Attorney, Agent, or Firm* — Hogan Lovells US LLP

(57) ABSTRACT

Pixel depth information is used to determine a weight to apply to neighboring pixels when using a sharpening filter. A difference between neighboring pixel depths is evaluated and pixels with pixel depths that exceed a threshold are given less weight than other pixels. A sharpening mask may be generated using adjusted pixel colors.

7 Claims, 11 Drawing Sheets

(56) References Cited

U.S. PATENT DOCUMENTS

2015/0015569 A1* 1/2015 Jung .................... G06T 3/4053
　　　　　　　　　　　　　　　　　　　　　345/419
2015/0036926 A1　　2/2015 Choi et al.
2018/0122285 A1* 5/2018 Ogaki .................... G09G 5/10

OTHER PUBLICATIONS

International Search Report and Written Opinion issued in PCT Application No. PCT/US2022/014705, dated Jul. 6, 2022.

\* cited by examiner

DEPTH BASED IMAGE SHARPENING

BACKGROUND

Sharpening may enhance an appearance of an image by providing more contrast and enabling certain portions of the image to stand out or otherwise draw focus from a viewer. Many sharpening techniques are color-based in that average colors for pixels surrounding a given pixel are determined and then the given pixel is adjusted. Certain techniques may take an input image, create a blurred copy of the image, and then subtract the blurred copy to obtain a sharpened mask, which is applied to the input image. While these techniques may be useful, colors at distinct edges may bleed into adjacent pixels, causing a haloing or outlining effect, which may be displeasing to a user to reduce how realistic an image appears.

BRIEF DESCRIPTION OF THE DRAWINGS

Various embodiments in accordance with the present disclosure will be described with reference to the drawings, in which.

DETAILED DESCRIPTION

Figure 1:
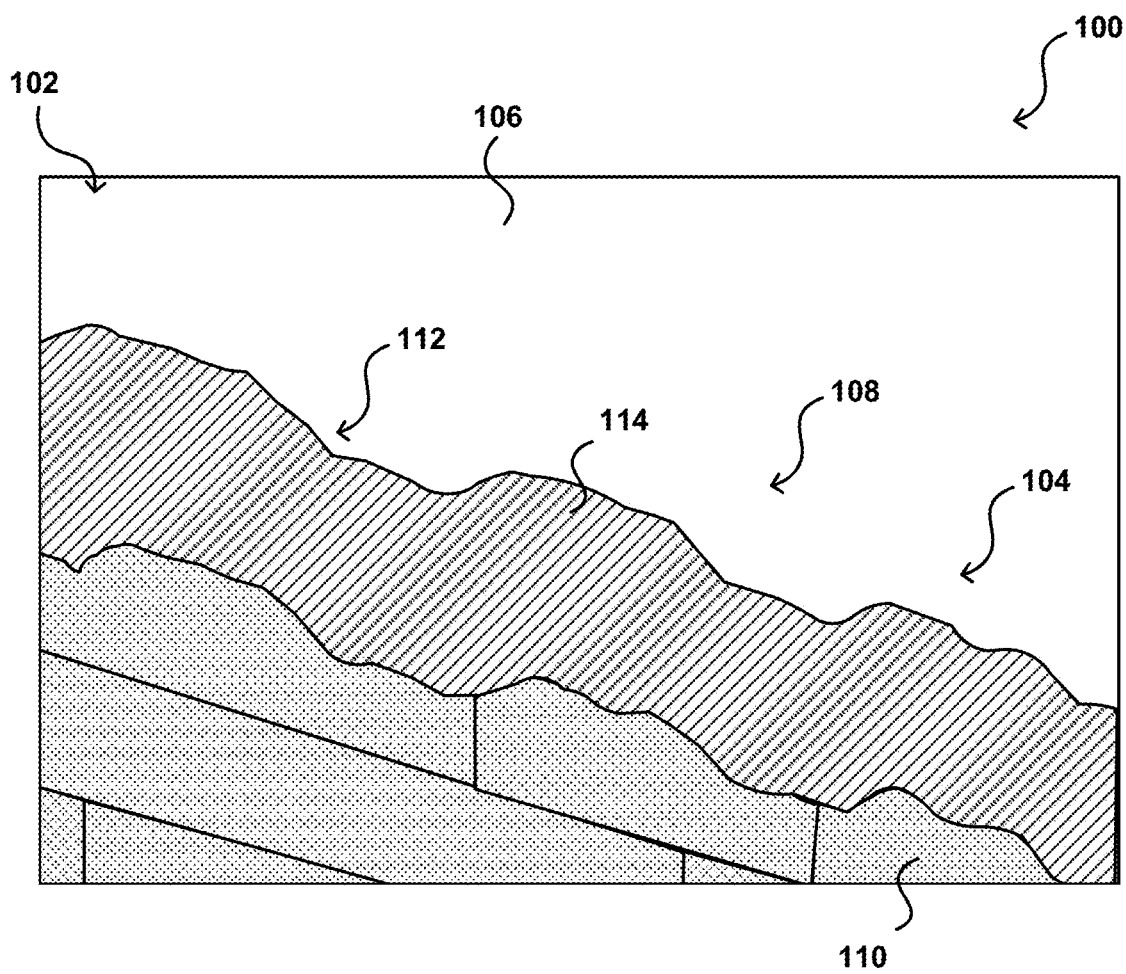
FIG. 1 illustrates an image including an object against a background, according to at least one embodiment.

Approaches in accordance with various embodiments provide for depth-based image sharpening where a pixel depth is utilized to determine whether adjacent pixels are utilized during a sharpening process. Image files, such as frames of a video image, may include pixel information for images forming the image files, which may include a depth value. The depth value may be used to determine a relative relationship between pixels, where images that are closer in depth to one another are more likely to be related than images that are farther away from one another. As a result, pixels at edges between features in the image, such as a feature against a background sky, may be removed from sharpening or may be weighted less during a sharpening process to reduce a bleeding effect between pixels, which may reduce the likelihood of haloing or outlining of the feature. FIG. 1 illustrates an example image 100 that may be sharpened using one or more sharpening techniques. In this example, the image 100 is formed from a number of pixels 102 which may each have data, such as an intensity or value that is representative of a color presented by the pixel. In this example, the image 100 includes a structure 104 against a background 106, which may be a portion of sky. The structure 104 includes a various components, such as a wall component 108 formed by bricks 110 and a top component 112. In this example, the top component 112 includes a pattern 114 or texture that is different from the bricks 110 forming the wall. In at least one embodiment, the structure 104 may be important to the scene represented within the image 100, and as a result, it may be advantageous to sharpen or otherwise emphasize the structure 104. A sharpening technique, such as unsharp masks, high-pass filters, Laplacian sharpening, bilateral filters, trilateral filters, and the like may be used.

Figure 2A:
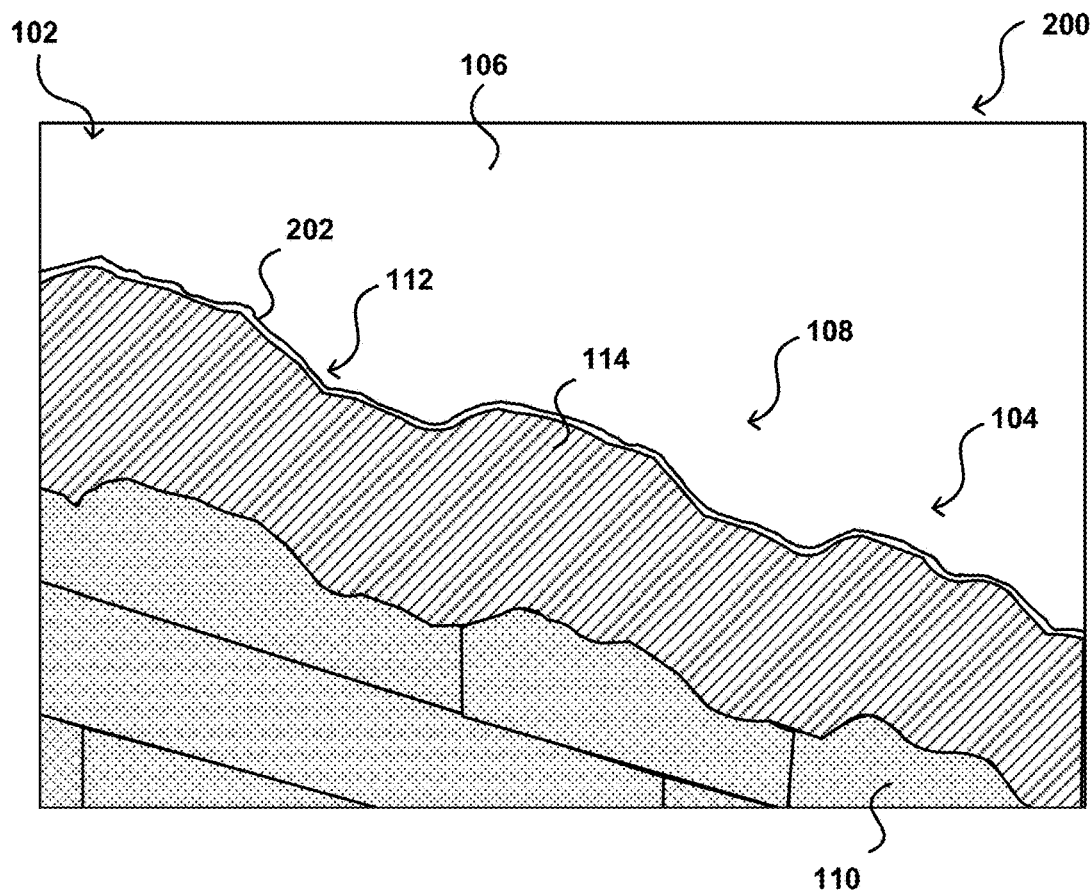
FIG. 2A illustrates a sharpened image with an outline, according to at least one embodiment.
Figure 2B:
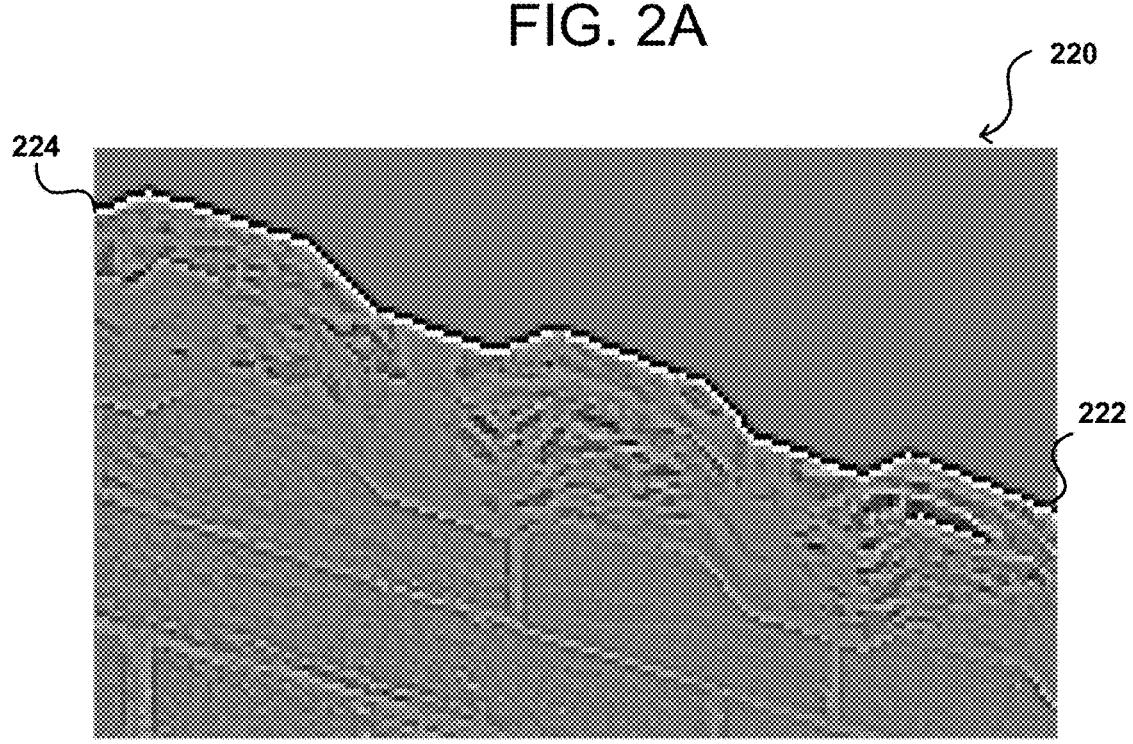
FIG. 2B illustrates a mark for sharpening an image, according to at least one embodiment.

FIG. 2A illustrates an example of a sharpened image 200, which may include similar features as image 100. In this example, a sharpening filter has been applied to the image 200 such that a halo 202 or outline appears between the background 106 and the top component 112 of the structure 104. This halo 202 may be a result of the filter, where colors from adjacent pixels may bleed into one another, which may amplify a difference in color. For example, to sharpen a base image, a blurry copy is generated (e.g., an image that has been blurred using one or more methods of blurring, such as a gaussian blur) and this blurry copy is subtracted from the original to determine an amount of sharpening, which may generate an image mask as seen in FIG. 2B. This happens for every pixel in the processed image. As an example with a certain pixel, if the blurry image is brighter than the original, for example due to leakage between colors, the sharpened output becomes darker. In other words, color changes from the original to the blurry version are inverted in the sharpened output. By way of example only, assuming a pixel has a brightness of approximately 50 percent (%), the same pixel on the blurred copy may be darker, such as approximately 40% due to leakage from adjacent pixels. As a result, a sharpening algorithm may measure this change, which in this example is a 10% decrease in brightness, and in response, do the opposite by increasing brightness by some percentage of the difference. Accordingly, if the pixel on the blurry copy would have been brighter than the base, the sharpened output would have become darker than the base.

The inverse response of the sharpening algorithm is further illustrated in the mask 220 shown in FIG. 2B. In this example, a first outline 222 is represented as a darkened portion compared to a second outline 224. As noted, the difference between the first and second outlines 222, 224 are the result of an overcorrection of brightness due to colors leaking between adjacent pixels in the image. Such an overcorrection translates into the sharpened image 200, resulting in the halo or outline 202. Embodiments of the present disclosure may overcome this problem by evaluating depth values associated with pixels and then either omitting pixels that exceed a threshold distance away from a selected pixel or by applying a weight such that as a difference in pixel depth increases, the effect of the pixel is reduced.

Figure 3A:
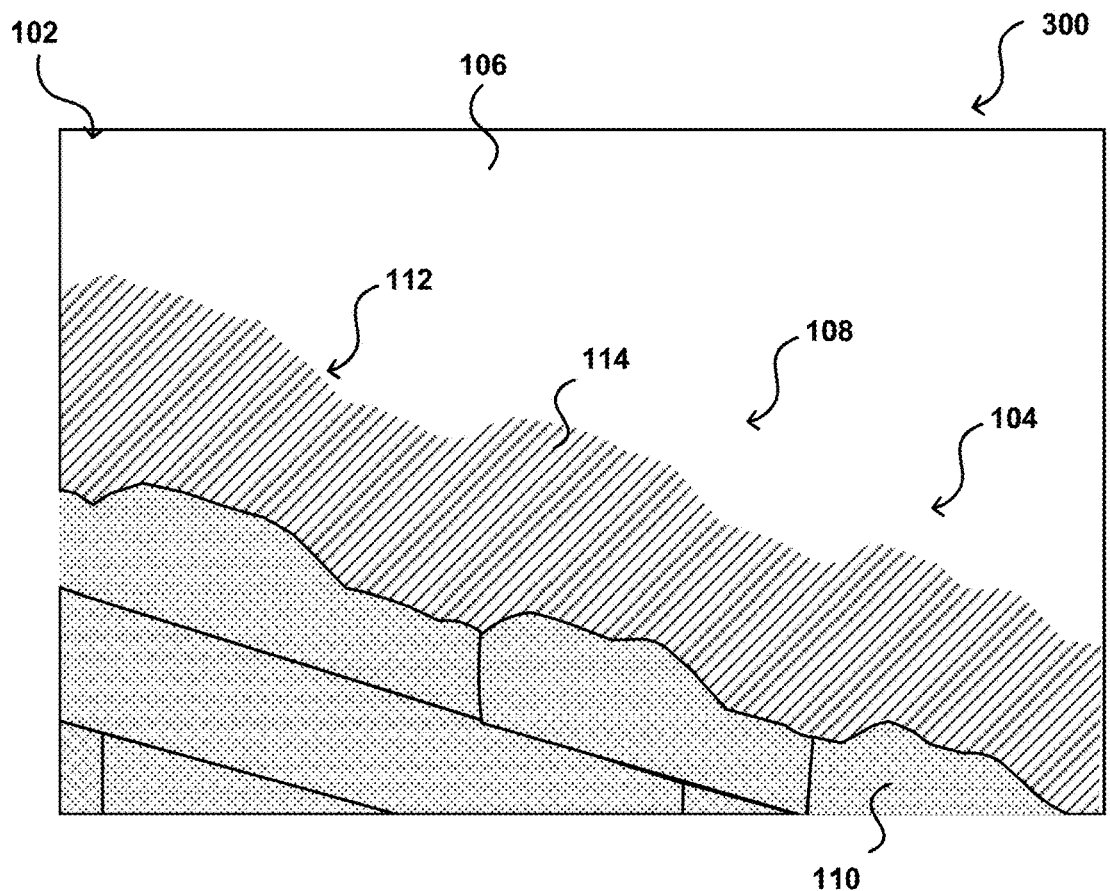
FIG. 3A illustrates a sharpened image, according to at least one embodiment.

FIG. 3A illustrates an example sharpened image 300 incorporating one or more of the depth-based sharpening techniques described herein. In this example, a clear delineation is formed between the top component 112 and the background 106. For example, when compared to the image in FIG. 1, an outline between the top component 112 and the background 106 is missing to illustrate an improvement in the sharpening process. Moreover, when compared to FIG. 2A, there is no halo 202.

Figure 3B:
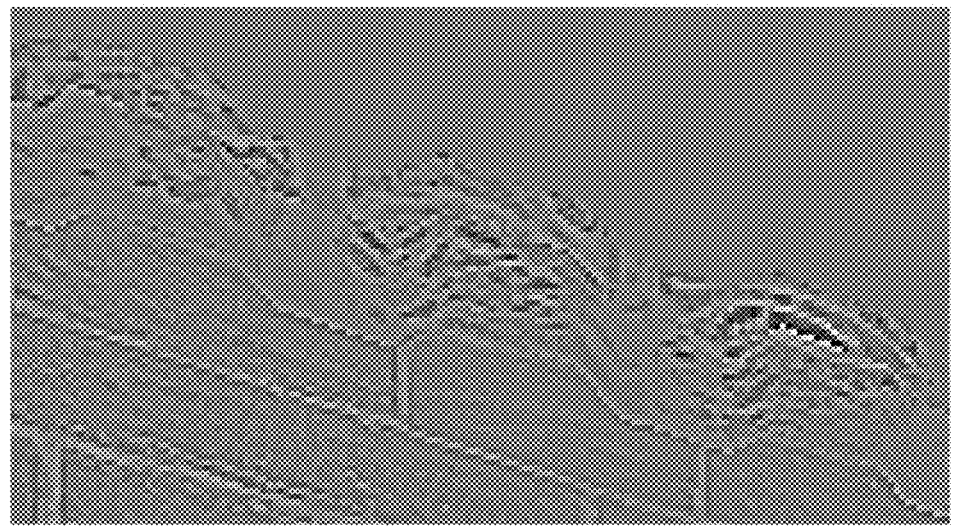
FIG. 3B illustrates a mark for sharpening an image, according to at least one embodiment.

FIG. 3B illustrates an example mask 320 incorporating one or more of the depth-based sharpening techniques described herein. As shown, when compared to FIG. 2B, the outlines 222, 224 are softened and/or eliminated. This represents reduced bleeding between adjacent pixels, for example, where pixels are removed or otherwise de-valued (due to weighting or the like) to reduce their affect when a depth value for adjacent pixels meets or exceeds a threshold. Accordingly, the overcorrection issues, noted above, are not applicable to the mask 320, and as a result, do not carry over to the sharpened image 300.

Figure 4:
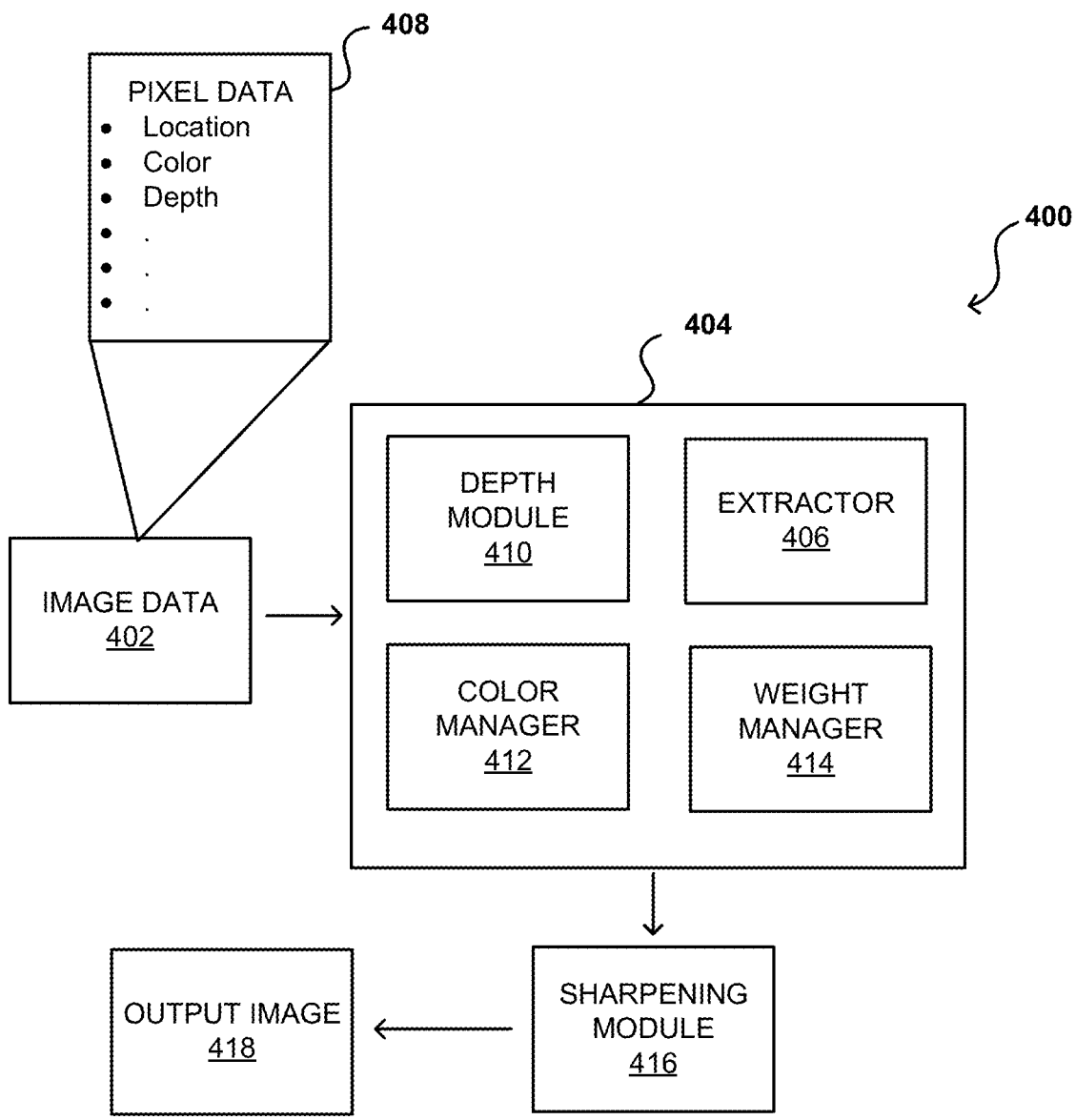
FIG. 4 illustrates a system diagram that can be used for image sharpening, according to at least one embodiment.

FIG. 4 illustrates an example image processing environment 400 that may be used to implement one or more features of the depth-based sharpening process. In at least one embodiment, image processing environment 400 is incorporated into an image processing flow or integrated into other image processing software. Furthermore, image processing environment 400 may be utilized with still images or with a stream of images, such as images extracted as frames from a video feed.

In this example, input image data 402 is provided to a depth-based sharpening system 404. For example, image data 402 may be streamed to the system 404 as a video feed, such as during a gaming session or associated with an autonomous or semi-autonomous vehicle, among other options. The system 404 may execute instructions stored on a memory via a processor and may include one or more computer-implemented steps as part of one or more algorithms. In at least one embodiment, an extraction module 406 extracts information from the image data 402. For example, image data 402 may include pixel data 408, which includes information for each pixel forming each frame of the image data 402. In at least one embodiment, pixel data 408 includes information such as pixel location, pixel color, and pixel depth, among other information. This information may be used, by the system 404, to select various pixels for sharpening.

A depth module 410 may extract pixel depth from the pixel data 408 or receive pixel depth data from the extraction module 406 and use the pixel depth information to compare different pixel relationships to one another. As an example, during a sharpening process, a pixel may be selected from a group a pixels. Adjacent or neighboring pixels may then be analyzed to determine whether the pixels will be included in a sharpening process. In at least one embodiment, pixels within a threshold depth will be included, while pixels exceeded the threshold depth are excluded. In at least one embodiment, pixels are weighted, based at least in part on a difference between a selected pixel depth and an adjacent pixel depth, where a larger difference leads to a smaller weight and a smaller distance leads to a larger weight. The depth module 410 may also evaluate pixels for presence of depth information and may provide an alert or end processing if image data does not include depth information for a threshold number of pixels. In at least one embodiment, the depth module 410 may be used on each pixel in the image data to determine relevant adjacent or neighboring pixels.

In this example, a color manager 412 is used to evaluate a color value or intensity for each pixel and to blend or blur colors based on the weights associated with adjacent pixels. As an example, the color manger 412 may extract color information from a selected pixel and adjacent pixels, or receive information from the extraction module 406, and then blend colors together when adjacent pixels are within a certain depth threshold. It should be appreciated that the color manager 412 may provide color information for blending and may not be used to render or produce colors in various embodiments.

A weight manager 414 may be used to store weight or threshold depth information for a variety of different images or image types. For example, the weight manager 414 may be associated with one or more data stores that include depth thresholds for different types of image data. In at least one embodiment, image information, such as initial resolution, may be utilized to select the threshold. Additionally, and by way of example, other types of image information may also be used, such as a data type (e.g., video, still images), a scene type (e.g., outdoor, indoor, dark), or a mode (e.g., live, gaming, etc.). Moreover, in embodiments, the weight or threshold data may be tunable by a user, and as a result, may receive user inputs. The weight manager 414 may provide threshold or weight information to the depth module 410 for processing. For example, weight information may be provided to enable generation of a blurred or intermediate image used for a sharpening algorithm.

Information provided by the system 404 may be utilized by a sharpening module 416 to produce an output image 418. For example, in various embodiments, the system 404 may produce a mask that is used by the sharpening module 416. In another example, the system 404 may produce data that the sharpening module 416 uses to generate a mask. It should be appreciated that the sharpening module 416 may be part of the system 404, but it is illustrated as a separate component for illustrative purposes only.

In operation, image data 402 is transmitted to the system 404. For each pixel in the image data, a pixel may be selected, which may be referred to as a center pixel, and a selected pixel depth value and selected pixel color are obtained. A kernel may be established for neighboring pixels, where the kernel may vary in size based on one or more properties. For example, the kernel may define adjacent pixels as pixels within a threshold axial or lateral distance. In at least one embodiment, definitions for adjacent pixels may vary based on image information, such as resolution and the like. Additionally, adjacent pixel definitions may be tunable by a user.

For each adjacent or neighboring pixel within the kernel, an adjacent pixel depth and an adjacent pixel color are determined. This information may then be utilized to blend colors together only when pixels are within a certain depth of the selected or center pixel. For example, a weight may be defined by a difference between an adjacent pixel depth and a center depth. The weight may then be normalized, for example between 0 and 1, and adjusted based on a threshold, which may be a defined value. Accordingly, a larger weight will be accorded to pixels that are closer to the selected pixel. It should be appreciated that, in various other embodiments, a weight may be assigned based on depth as either 1 or 0, where zero is assigned to a pixel that exceeds a certain threshold distance and 1 is assigned to a pixel that does not exceed a certain threshold distance. That is, various weighting or thresholding techniques may be utilized with embodiments of the present disclosure.

In certain embodiment, a neighboring pixel color may be adjusted based at least in part on the weight. For example, the neighboring pixel color may be adjusted in view of the weight and the center pixel color. That is, the colors may be blended together, where a higher weight results in more blending than a lower weight. This may enable blurring of the selected color, where the blurring may be based, at least in part, on the adjusted neighbor color. Moreover, a weight may be added to the blurring. Thereafter, the blurred color may be transmitted to a sharpening filter, which may calculate luma for the selected pixel and the blurred color and then sharpen the pixel based, at least in part, on a sharpening intensity. An output image may then be generated. As an example, pseudocode provided below may describe a process for depth-based image sharpening:

for each pixel in image

```
center_depth = get_depth(pixel)
center_color = get_color(pixel)
blurred = center_color
blurweight = 1;
for each neighbour in blurkernel
    neighbour_depth = get_depth(neighbour)
    neighbour_color = get_color(neighbour)
    weight = |neighbour_depth - center depth|
    weight = max(0, 1 - weight * DEPTH_TRESHOLD)
    neighbour_color = neighbour_color * weight + center_color * (1 - weight)
    blurred = blurred + neighbour_color
    blurweight = blurweight + 1
end
blurred = blurred / blurweight
sharpen = calculate_luma(center_color) - calculate_luma(blurred)
sharpen = sharpen * SHARPEN_INTENSITY
output = center_color + sharpen
end
```

Figure 5:
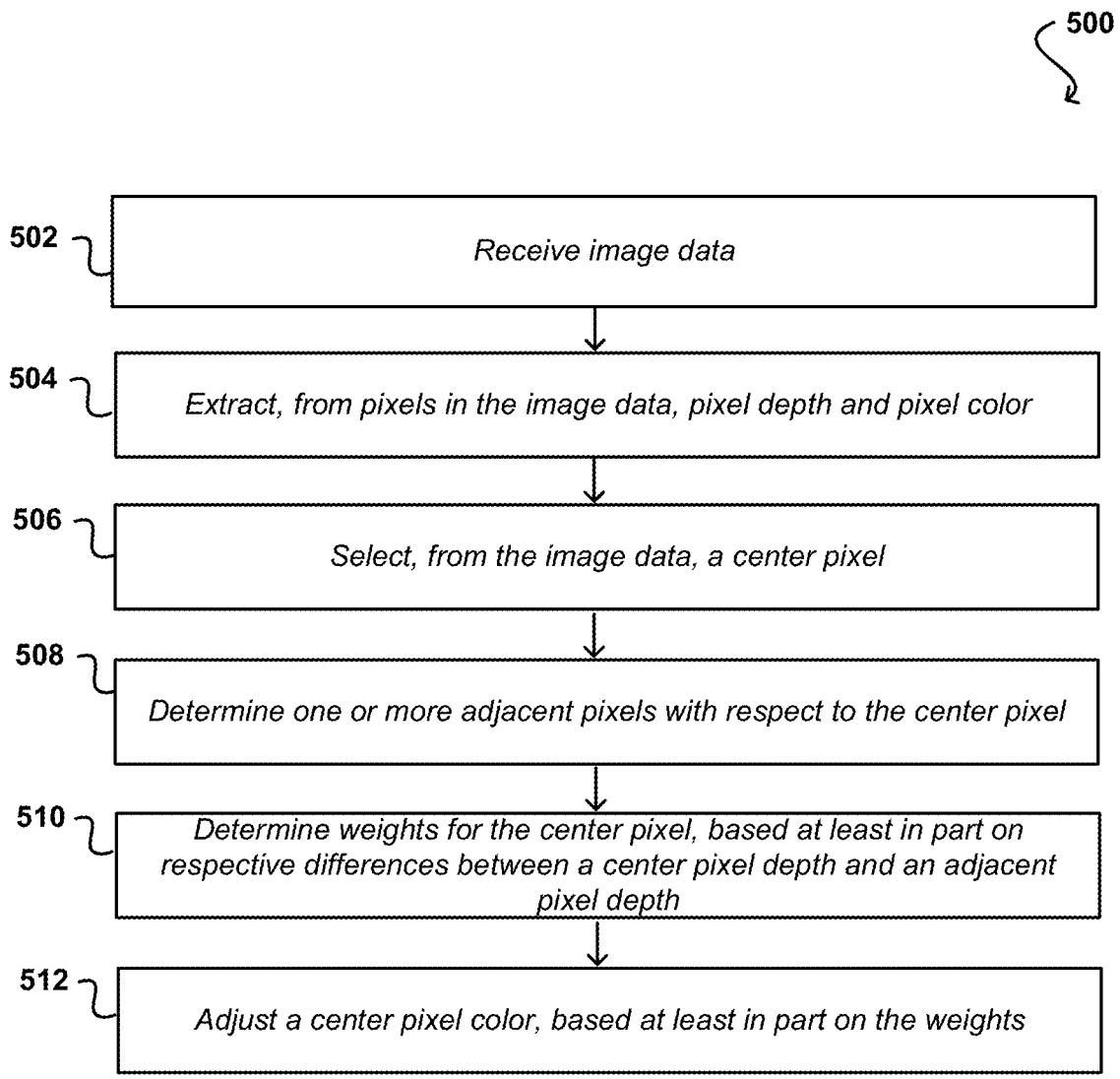
FIG. 5 illustrates an example process for adjusting pixel colors in an image, according to at least one embodiment.

FIG. 5 illustrates an example process 500 for adjusting a pixel color, based at least in part on a pixel depth. It should be understood that for this and other processes presented herein that there can be additional, fewer, or alternative steps performed in similar or alternative order, or at least partially in parallel, within scope of various embodiments unless otherwise specifically stated. In this example, image data is received 502. The image data may correspond to a still image, a frame from a video feed, or the like. Moreover, the image data may be part of a continuous stream of data where one or more frames are selected for processing. Pixel information is extracted from the image data 504. For example, pixel information may include a pixel depth and a pixel color, among other types of information such as location. Pixel depth may correspond to a draw distance or a portion of a draw distance when referring to pixels used in video games, as an example. In other words, depth information may refer to three-dimensional positioning between pixels within the image data.

In at least one embodiment, a center pixel is selected 506. It should be appreciated that center does not necessarily refer to a central pixel within the image, but a pixel that will act as a center for determining whether or not a pixel is a neighboring or adjacent pixel. Accordingly, center pixels may also be referred to as selected pixels. One or more neighboring pixels are determined with respect to the center pixel 508. In various embodiments, different thresholds may be applied to determine whether a pixel qualifies as a neighboring pixel. By way of example only, a neighboring pixel may be a pixel within a certain lateral distance of the center pixel. In another example, a neighboring pixel may be a pixel within a set number of pixels. In at least one embodiment, a neighboring pixel may be determined, at least in part, by other pixels associated with the center pixel. For example, a center pixel at an edge may have fewer neighboring pixels than a center pixel near a center of an image.

In at least one embodiment, weights are determined for the center pixel 510. Weights may be computed, based at least in part, on a difference between a center pixel depth and a neighboring pixel depth. In various embodiments, the weight is equivalent to an absolute value of a different between a neighbor pixel depth and a center pixel depth. Moreover, the weight may be adjusted or normalized, such as between 0 and 1, where 0 would apply no value to associated components and 1 would apply a total value of associated components. In at least one embodiment, the weight is calculated by a depth threshold, which may be a dynamically adjustable or set value. For example, the depth threshold may vary by image type or image data type, among other options. It should be appreciated that increasing the depth threshold will decrease the weight in certain embodiments.

In at least one embodiment, a center pixel color is adjusted, based at least in part on the weights 512. For example, the calculated weights may be used to compute a blurred color that is input into a filtering algorithm to adjust a color of the center pixel. In various embodiments, pixels that are closer, based on the depth value, will apply greater changes to center pixel colors than pixels that are farther away. Accordingly, background scenes, such as a sky, may not affect pixels of objects in front of the sky to such a degree, where may reduce or eliminate outlines or haloing of the objects.

Figure 6:
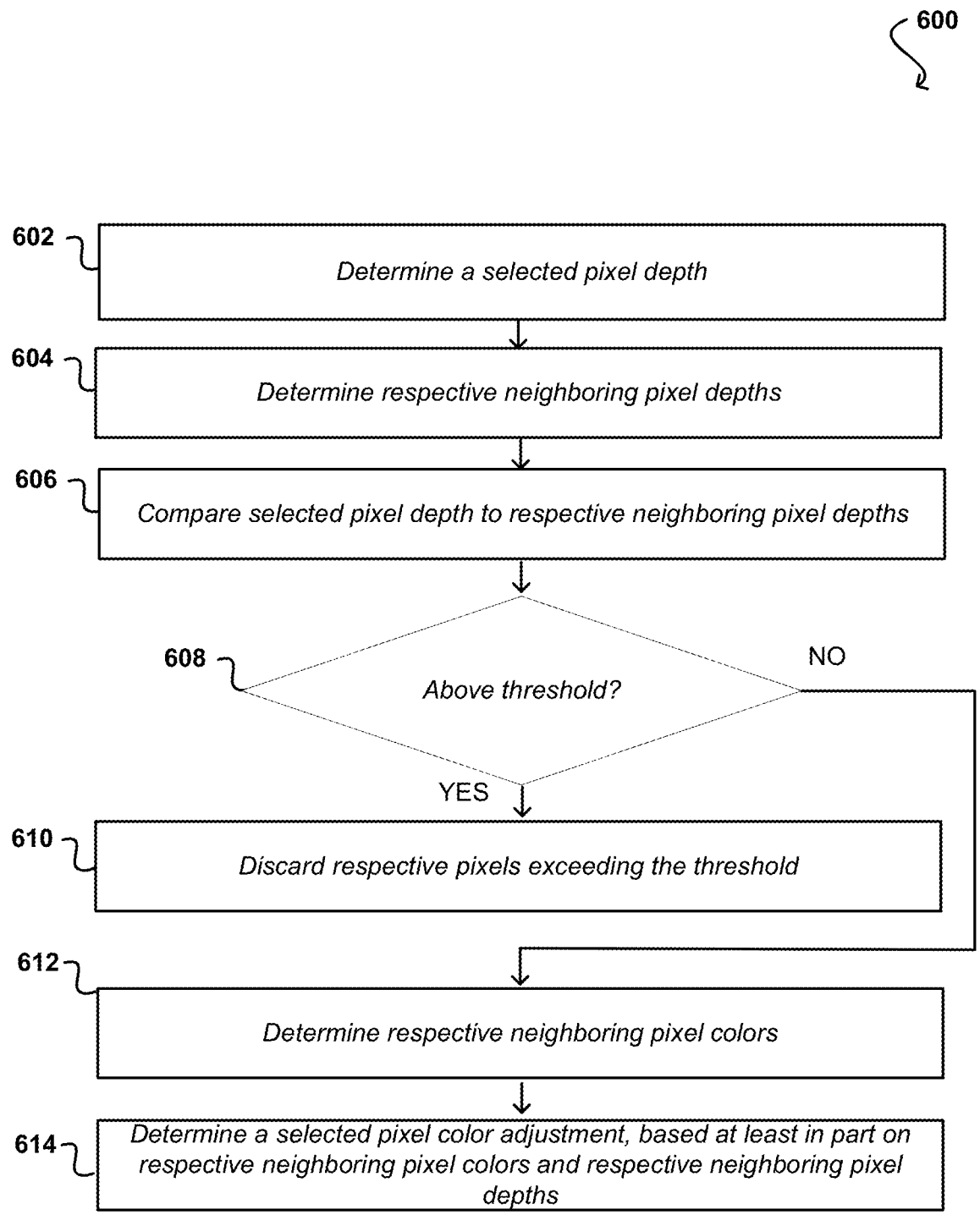
FIG. 6 illustrates an example process for determining a pixel color adjustment, according to at least one embodiment.

FIG. 6 illustrates an example process 600 for determining color adjustments in pixels. In this example, a selected pixel depth is determined 602, which may correspond to a draw distance in a three-dimensional image or may be determined from metadata extracted from a still image. In at least one embodiment, respective neighboring pixel depths are determined 604. Neighboring pixels may correspond to pixels within a threshold lateral distance of the selected pixel, such as pixels within a certain radius or within a defined kernel. These respective neighboring pixel depths may be compared to the selected pixel depth 606 and evaluated against a threshold 608. If a difference between the selected pixel depth and one or more neighboring pixel depths exceeds the threshold, the one or more neighboring pixels are discarded 610. If a difference between the selected pixel depth and one or more neighboring pixel depths does not exceed the threshold, respective neighboring pixel colors are determined 612. These colors may be used, at least in part, to determine a selected pixel color adjustment 614. In this manner, pixels that are closer to the selected pixel may be more heavily on color adjustments than pixels that are farther away.

Figure 7:
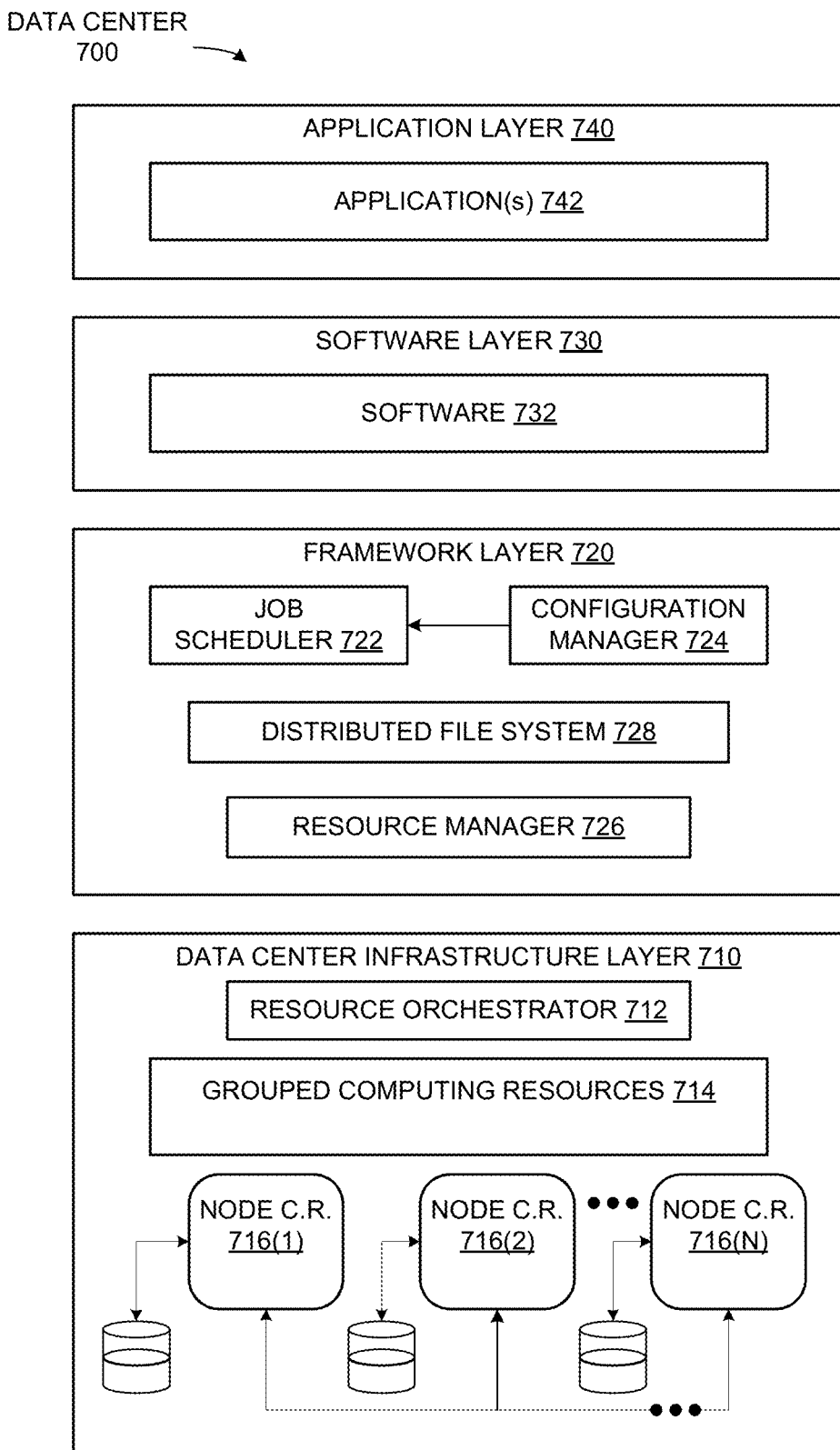
FIG. 7 illustrates an example data center system, according to at least one embodiment.
Figure 8:
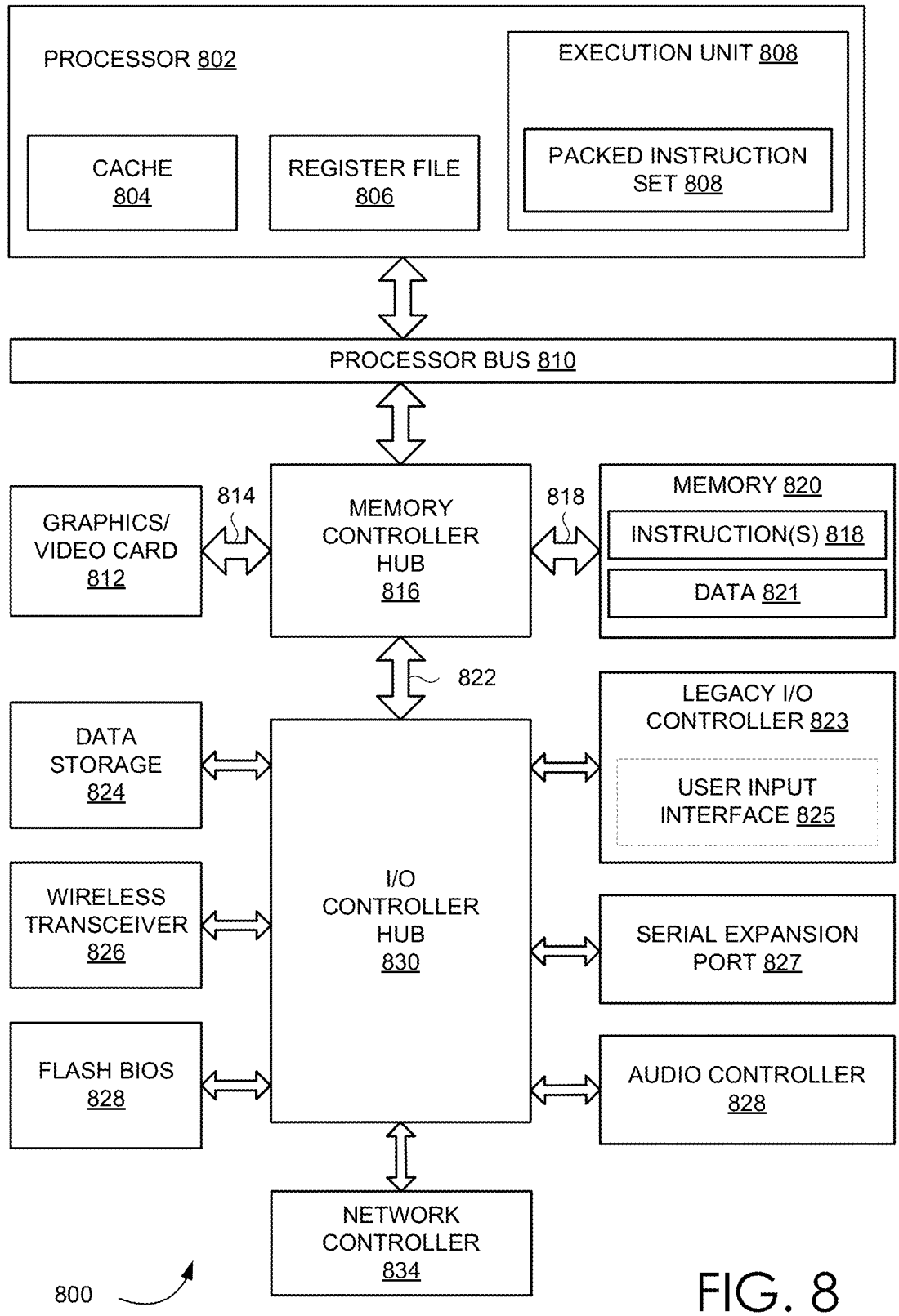
FIG. 8 illustrates a computer system, according to at least one embodiment.

This color adjustment and any sharpening procedures can be performed on a standalone client device, or a remote server in a data center, among other such options. FIG. 7, discussed in more detail below, illustrates example components of a data center, while FIG. 8 illustrates components of a computer, such as a desktop computer or content server. Depth-based image sharpening can be performed in a graphics processing unit (GPU), as discussed with respect to FIGS. 10 and 11, but can also be executed using CPUs, combination GPU/CPUs, or other such processing devices.

Data Center

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW IO") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for depth-based sharpening processes.

Computer Systems

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used depth-based sharpening processes.

Figure 9:
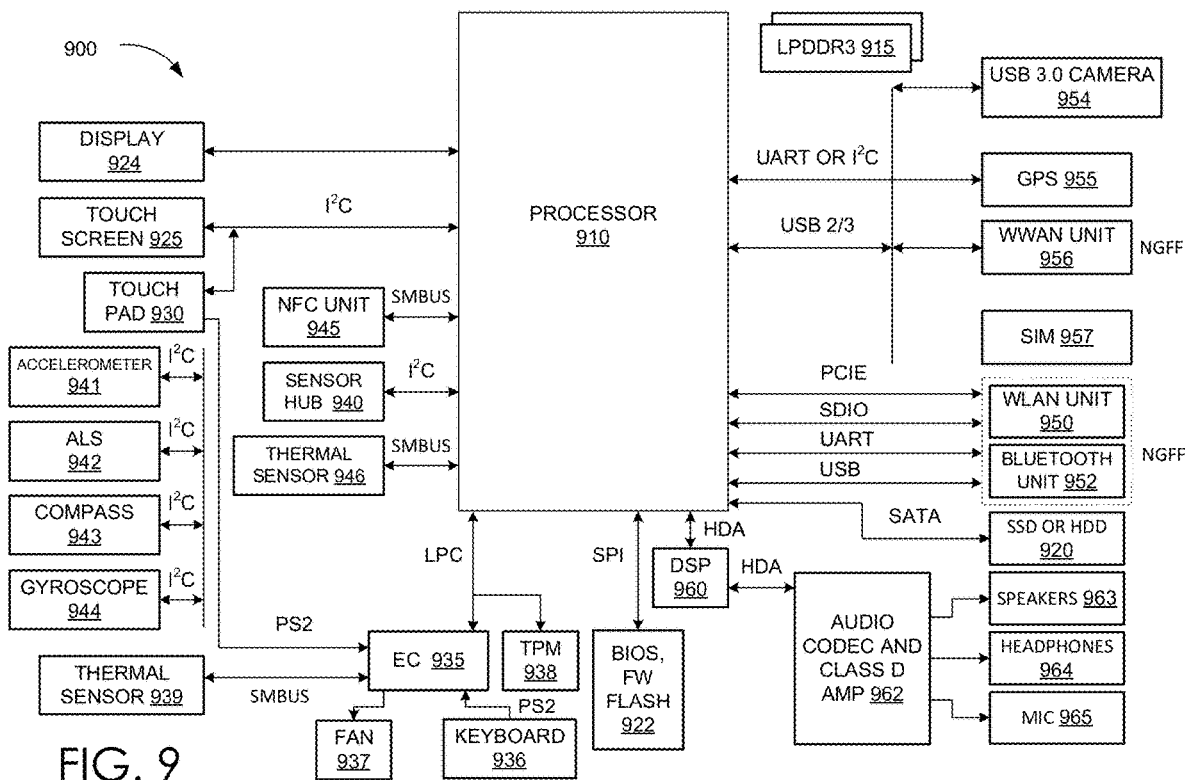
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used depth-based sharpening processes.

Figure 10:
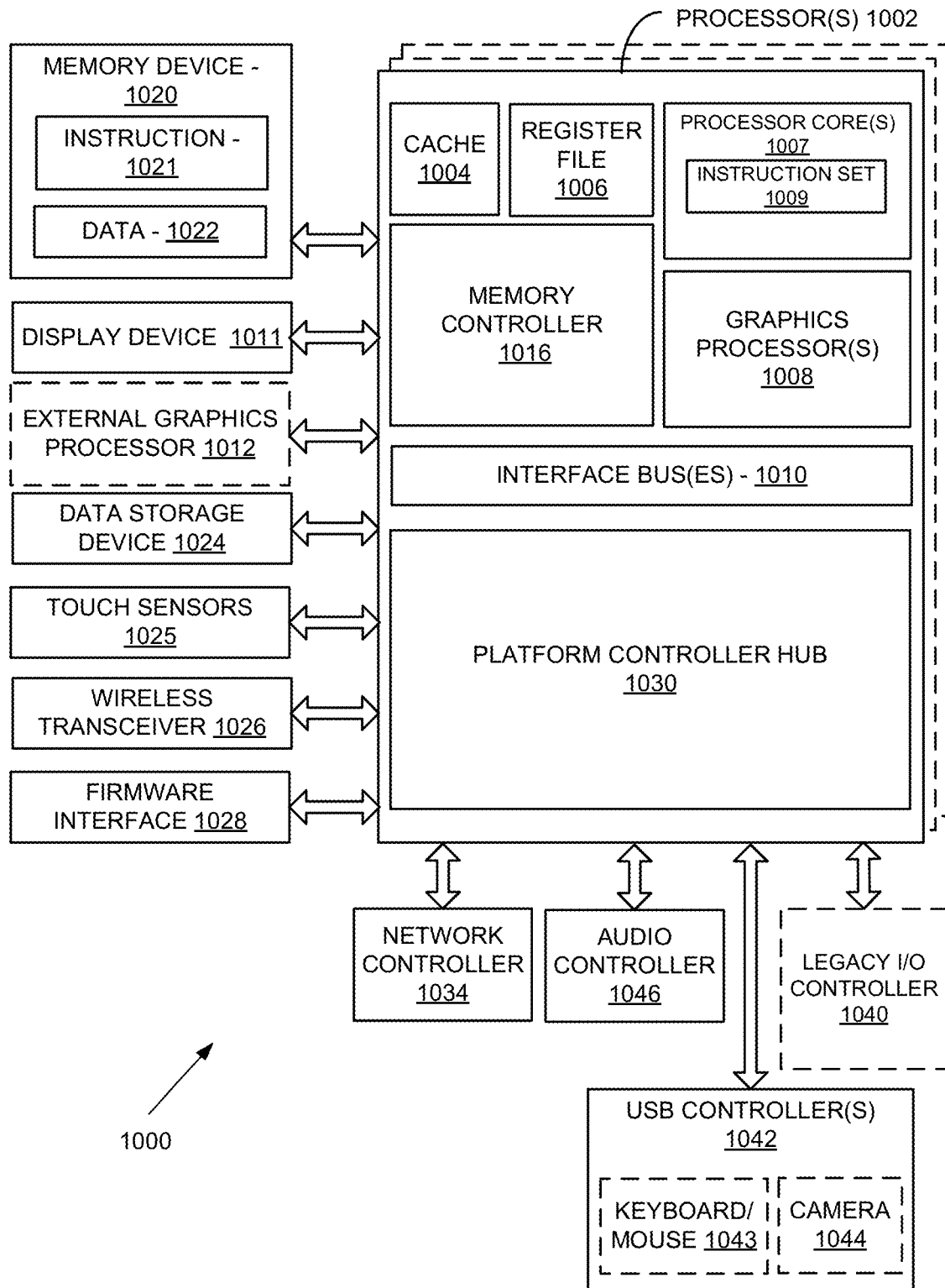
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used depth-based sharpening processes.

Figure 11:
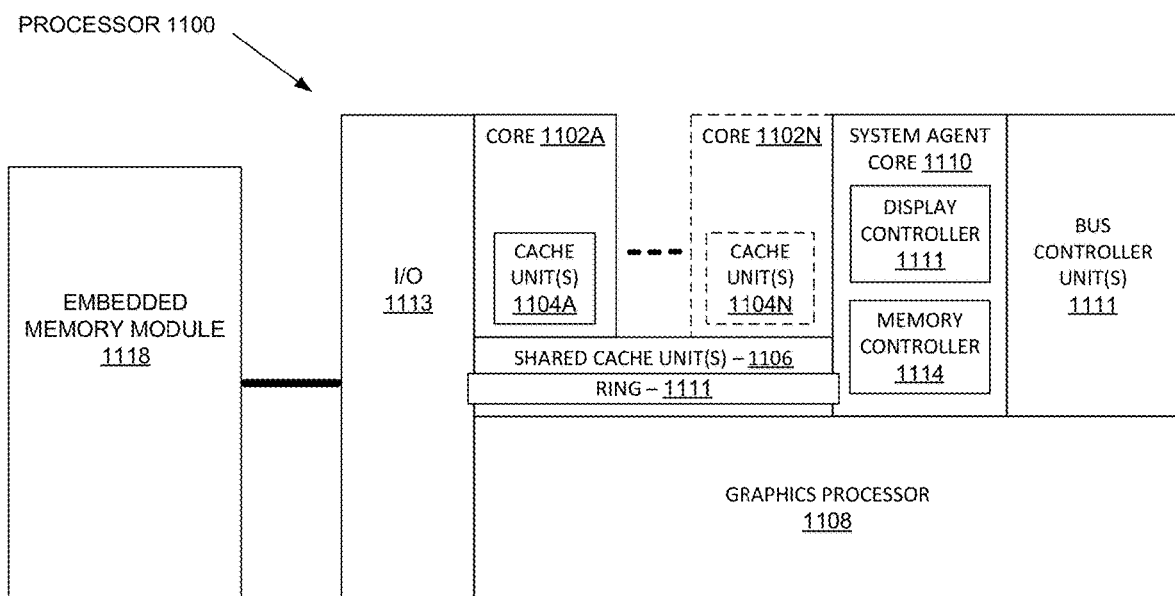
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used depth-based sharpening processes.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   determining a first pixel depth corresponding to a first pixel;
   determining a second pixel, the second pixel being within a threshold lateral distance of the first pixel and corresponding to a second pixel depth less than a threshold depth;
   determining, based at least on the second pixel being within the threshold lateral distance of the first pixel and the second pixel depth being less than the threshold depth, a weight corresponding to the second pixel, the weight being based, at least in part, on a difference between the first pixel depth and the second pixel depth and one or more parameters of an image including the first pixel and the second pixel; and
   adjusting a first pixel color, based at least in part on the weight and a second pixel color.

2. The computer-implemented method of claim 1, further comprising:
   applying a sharpening filter to the first pixel and the second pixel.

3. The computer-implemented method of claim 1, further comprising:
   determining an adjusted second pixel color, based at least in part on the second pixel color, the weight, and the first pixel color.

4. The computer-implemented method of claim 3, further comprising:
   adjusting the first pixel color, based at least in part on the adjusted second pixel color and the second pixel color.

5. The computer-implemented method of claim 1, wherein the weight corresponding to the second pixel is directly proportional to the difference between the first pixel depth and the second pixel depth.

6. The computer-implemented method of claim 1, further comprising:
   receiving a stream of image data; and
   selecting, from the stream, an image frame.

7. The computer-implemented method of claim 1, further comprising:
   providing an adjusted first pixel color to a sharpening filter for calculation of a mask.

* * * * *